Dec. 8, 1953  J. M. BAGGOTT  2,662,045

METHOD OF MAKING JOINT

Filed April 27, 1949

INVENTOR
JAMES M. BAGGOTT
BY
Robert B. Perry
ATTORNEY

Patented Dec. 8, 1953

2,662,045

UNITED STATES PATENT OFFICE 2,662,045

METHOD OF MAKING JOINT

James M. Baggott, Zeigler, Ill.

Application April 27, 1949, Serial No. 89,978

8 Claims. (Cl. 154—126)

This invention relates to improvements in plastic joint construction and materials therefor, and more particularly to an improved joining method of bonding elements of solid materials, such as wood or the like, the invention further including a novel joint of high strength, and improved joining materials.

The present invention may be summarized by noting that it involves the utilization of a resin-coated, thin conductive sheet disposed between companion elements of solid material or materials, the passage of an electric current through, with the effect of heating the conductive sheet, resulting in the cure of the resin to perfect the bond between the joined elements. The present development further includes a novel coated sheet material such as metal, of such physical characteristics and with an applied layer or layers such that all necessary materials to constitute the bond are supplied as a single product or article of manufacture. The technique identified with the method to be described, may be summarized as a low pressure, extremely fast, low cost procedure for uniting paired, substantially planar pieces of material, for example pieces of wood as well as many fabricated wood products and derivatives of wood, metal, glass, molded or other plastic sheets, plates and forms, to mention but a few of the many materials suitable to be bonded by the novel method and materials.

Numerous advantages and objects of the present improvements will clearly appear from the following detailed description of exemplary materials for joining solid elements, the method and steps involved in such process, and the resulting joint construction, all as will more clearly appear when considered in connection with the accompanying drawing, in which.

Figure 3:
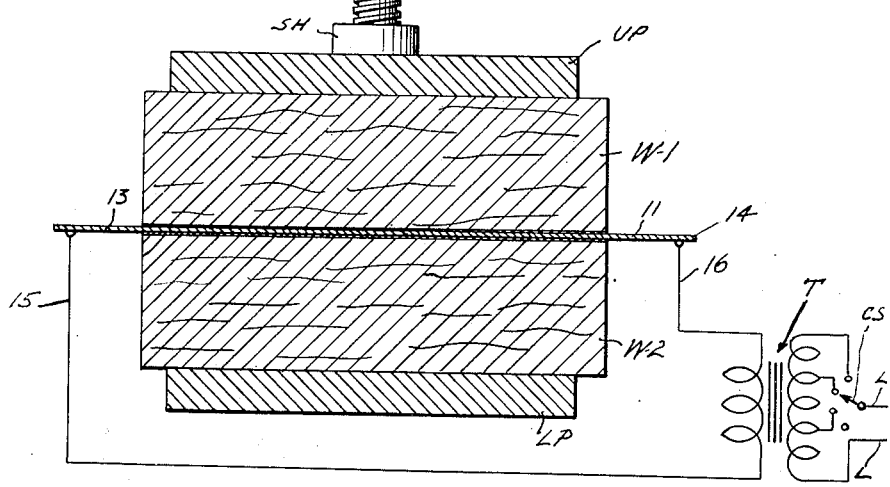
Figure 4:
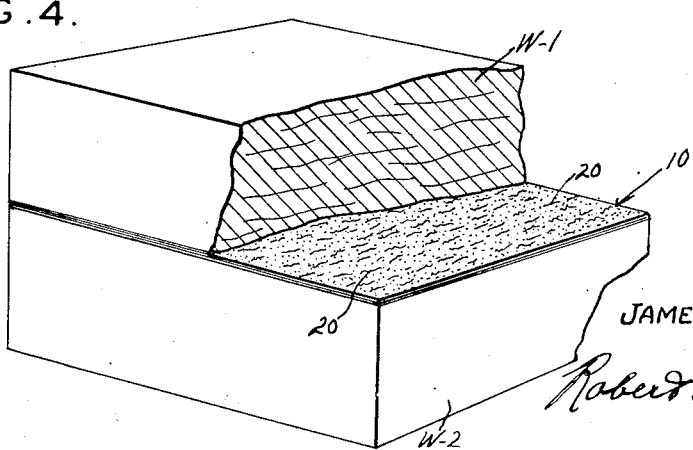

Fig. 3 is a sectional elevational view of equipment including superposed elements to be joined, and an interposed layer of coated metal foil, including a schematic circuit diagram to indicate one method of application of a curing current to the coated foil, and Fig. 4 is an isometric view of a completed joint in which one of the bonded elements is shown broken away in order to reveal the character of the bonding layer, after completion of the joint.

Figure 1:
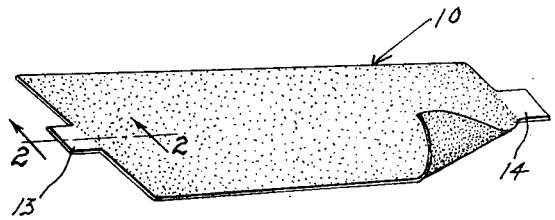
Fig. 1 is an elevation in perspective of a small panel of resin-coated sheet metal such as foil, suitable for application between the pair of elements to be joined, in the practice of the present invention.
Figure 2:
Fig. 2 is a greatly enlarged sectional view as taken along line 2—2 of Fig. 1.

Referring now by characters of reference to the drawing, and first particularly to Fig. 1, there is indicated generally at 10 a coated sheet of a highly conductive metal which, by preference, consists of an extremely thin, readily deformable panel, section, strip or ribbon of a non-ferrous, highly conductive metal such as copper or aluminum foil. For this purpose aluminum foil is preferred. The metal may contain a reasonable proportion of an alloying ingredient, being of itself a product in roll or like form as an article presently available in commerce. For the best practice of the present improvements, the metal foil is regarded as a metal of such thinness and temper as to be readily shaped, formed or manipulated by light pressure applied thereto, for example, by digital pressure, and of such gauge that the sheet material may be applied to moderately irregular surfaces, with certain and ready conformity to the relatively high and low portions of such irregular surface. A further criterion of the best suitability of the metal foil for present purposes is its wrinkling characteristic, i. e. the foil is preferably of such nature that it will accept a moderate out-of-plane deformation, without tearing, perforating or ripping, so that it will conform to relatively rough mating surfaces of a joint, without projection of the peaks of such surfaces through the foil. Any reasonably conductive material possessing the aforesaid characteristics is suggested as a base for the coated member 10.

Preferably both faces of the foil base indicated at 11, are coated with a synthetic resin possessing the properties of polymerization or other curing or solidifying effect under the influence of moderate applied temperatures. Many such resins are currently available to the trade, among which may be noted those of both thermosetting and thermoplastic types. The coating indicated at 12, should, of course, be the same on the opposite sides of the foil. As a convenience for making electrical connections as will appear, opposite margins of the coated foil are provided with extensions such as the uncoated lugs, tabs or ears 13 and 14.

The present invention in its broadest aspect includes a prepared material such as the coated foil of Fig. 1, which may be supplied in sheet or roll form, with suitable provisions (not shown) for preventing unwanted adhesion between the green or uncured, or the incompletely cured coating on the sheet. Such material, it is contemplated, will be supplied to the trade for practice of the bonding method or process later to be described.

In the practice of making a bond between two or more pieces of wood or the like to constitute a strong finished joint, a setup is suggested in substantial accordance with Fig. 3, and includes a pair of superposed wood elements W1 and W2, firmly held between the upper platen UP and the lower platen LP of a press which includes a screw element S and a swivel head SH forming a part of or bearing against the upper platen. No great physical pressure is necessary in the practice of the present steps of completing a finished joint, although it is desirable to restrain to a certain extent, any separating movement of the elements W1 and W2 during the cure of the joining material.

Further to particularize the preferred characteristics of the thin coated conductive sheet 11 such as aluminum, this is by preference of a gauge or thickness not in excess of six one-thousandths inch, and even better results are had if it be of a gauge of the order of four one-thousandths inch or less. The applied coating 12 need not usually exceed on each face, a thickness of ten one-thousandths and in most cases a thickness of the order of five one-thousandths inch of the resin, will suffice. A foil of a thickness not exceeding .001" has been successfully utilized in joining blocks of wood by the present process.

Now with further reference to the arrangement of elements in Fig. 3, the platens of the press are separated to permit insertion of the elements W1 and W2 to be joined, and with an appropriate width of the bonding resin-foil inserted therebetween, and with the terminal or contact ears or lugs 13—14 projecting from opposite sides of the joint, as suggested by Fig. 3. To these connectors 13—14 are attached current supply leads 15 and 16 respectively, the latter being for example, connected into the secondary of a transformer T if this be desirable or necessary, and the transformer being energized from the line conductors L through a multipolar control switch CS. The transformer and directly related parts, since forming per se no part of the present improvements, are merely diagrammatically illustrated in Fig. 3. As will appear, the coil taps and several poles of switch CS, provide for an increase or reduction in the heating energy to the foil, as may be desired.

Proceeding now to describe the steps and sequence thereof in joining adjacent paired solid elements such as W1 and W2, with the latter set up in a press, and with the coated foil 10 between them, switch CS is closed, resulting, as will now be obvious, in the passage of a current through the conductive base of the material 10. The electrical energization of this circuit can be quite adequately carried out in a circuit which, if an A. C. circuit, may operate at any usual commercial frequency such as sixty cycle for example, as has been successfully employed. The process is not by any means dependent upon, nor does it require any expensive or complicated electrical apparatus in order to bring about a thermal cure of the layer of bonding resin. It is here noted that, by way of example only and without restriction, the passage of a current of the order of fifty volt-amperes per square inch of joint or foil, for each .001 inch gauge of foil is sufficient for only a few seconds applied time, together with the remanent heat of the foil and in the other material adjacent the region of the joint, to complete the cure, inasmuch as the heat is definitely concentrated exactly in the zone or region where needed for the cure, namely, in the joint itself.

Upon closing of the switch CS, and energization of the circuit 15—10—16, the temperature of the foil-resin layer will be quickly raised to a point such that, in the case of a thermosetting resin, only a minor period of current-on time is needed, in proportion to the total setup time recommended for the particular resin. It is highly desirable that completion of the setup or cure occur during a so-called cooling off period, the latter being considered as the major and later portion of the total setup or curing time. This procedure has been found advantageous in order to compensate for the differences in rates of thermal expansion of the various elements going to make up the joint.

To provide a few specific examples of the curing steps involved, it is noted that blocks of wood on opposite sides of the joint, the latter including an aluminum foil of .001" gauge coated with a thermoplastic resin of a few thousandths thickness, has resulted in a completely cured joint with a current-applied time of five seconds, followed by a current-off time of a period of the order of five minutes. Similarly, small wood elements have been joined by the use of a foil of one to two thousandths inch gauge, coated with a thermosetting resin of phenolic type in ten seconds current-applied time. The ten second current-on period may be followed by a moderate period of a reduced or zero applied current, and resulted in a joint of substantial strength. Such second phase of cure is quite variable, particularly when utilizing thermosetting resins, by reason of the great variety of such resins and the presence or absence of catalysts. In nearly all cases involving the joining of elements such as wood or other material of low thermal conductivity, and with an applied current of the order of fifty volt-amperes and other stated conditions, the current-on or first minor time of cure will thus be of the order of five to fifteen seconds, immediately followed by a continuation of the cure, but with the current off or reduced, of the order of at least five to fifteen minutes, and perhaps considerably longer. If the joined elements be unstressed, only a light physical pressure or none at all, is necessary, assuming a good adhesion of the partly cured resin during the second stage or phase of cure.

It should be noted that it is undesirable to protract unduly the current-applied period of cure. In fact it has been found that completion of the setup should occur for best results, during the described cooling-off period, it being noted that, since the foil will expand somewhat ahead of the resin and the elements to be joined, it will again shrink or contract relative to the other joint materials, during the second or current-off period of the cure. It is highly desirable, as will now be obvious, that some of the movement of the foil during this latter period occur while the resin retains an appreciable plasticity.

It should be distinctly noted that the aforesaid steps and the process involved, utilize the application of heat within the joint or so-called glue line, in the case of a thermosetting resin coating of the element 10, to polymerize, i. e. to set up or cure the resin; alternately, in the case of a thermoplastic film or coating on the element 10, the dual phases of heating for cure, involve first a softening or partial fusion of the thermoplastic film, followed by a phase of hardening, set or solidification.

The steps of the present technique may be distinguished in yet another manner, as will now appear: Due to the utilization of an extremely thin sheet metal or other highly conductive permanent layer, the first or current-on step produces, due to the partial physical confinement of the coated foil between the bonded elements, a distinct in fact an obvious waving, wrinkling or crinkling effect in the foil during this first heating portion of the whole cycle of cure. This wrinkling has been found advantageously to obviate any deleterious effects due to differential rates of thermal expansion of the various elements going to make up the joint. This wrinkling or other deformation further results in a useful conformity of the coated foil to the various surface irregularities of both of the elements such as W1 and W2, and for this reason the materials and method as described are highly useful, in that it will obviate the need for any prior surfacing operation of the elements W1 and W2, and thus obviates any working or other treatment of the foil such as stamping or beating thereof.

Although perhaps now more or less self-evident, the use of a foil, in distinction over sheet metal or wire elements of greater gauge or thickness, will be seen to require for the cure, lower current values, consequently smaller conductors as well as lighter and less expensive transformers, generators or similar equipment for any given voltage than would be the case were a metal base of heavier gauge employed.

It will now have become obvious that the first step of clamping the joining material 10 between the blocks or other elements W1—W2, the ensuing short step of current application, say of five to fifteen seconds, followed by the continuation of cure during the described current-off period by opening switch CS, will serve to complete the cure or setting of the resin. Following this, now obviously, the conductors 15 and 16 are disconnected, the platens of the press are opened, and joint completed.

A reference to the completed joint may best be made by reference to Fig. 4, wherein the member W1 is partly broken away to indicate the various crinkles, wrinkles or deformed portions 20 in the now-cured foil layer. The projecting tabs or terminals 13—14 are readily severed prior to stacking, storing or utilization of the joined elements for any purpose desired.

I am aware that various attempts have heretofore been made to bond elements of wood or the like by the use of wires or screen elements or interposed compounded materials; such practices however result in extremely irregularly cured resins in the joint region. This is due, it is believed, to the fact that in order to complete a cure in the regions between spaced elements such as the wire of a screen, it is necessary to overcure and perhaps carbonize to some degree, the resins immediately adjacent the wires or like heating elements. The use of a foil possesses a very distinct and important advantage of permitting free local expansion and contraction of the current conductor in the region of the joint, permits heat values to be kept safely below charring temperatures, and results in a highly desirable physical adaptation of the bonding sheet to the surface irregularities of the jointed units.

Reference has and will be made in the present specification and claims, to an uncured or green resin as a coating for the foil sold as an article of manufacture. It is of course contemplated as being within such terminology, an incompletely polymerized resin coating, for example, a resin which has been cured to either an "A" or a "B" stage, and in which a final stage of cure is effected as hereinabove described.

For brevity of description of materials which have been successfully utilized to some extent, reference has been made to the juncture of wood blocks, but without intended restriction to specific materials, since, as noted, many others may be satisfactorily joined by the method and materials described. Accordingly, although the present description has been directed with particularity to a few specific examples of practice and products, numerous variants are possible within the full intended spirit and scope of the claims hereunto appended.

I claim as my invention:

1. The herein described method of bonding a pair of solid elements, which consists in coating a conductive foil with a thermal curing resin of predetermined time-temperature setting characteristics, disposing the foil between the elements to be bonded, applying a heating current to the foil for a portion of the predetermined setting time thereof, and for a period of time sufficient to cause an appreciable thermal deformation of the foil during a time that the resin exists in a plastic condition.

2. The described method of joining a pair of solid elements, which consists in coating a conductive foil with an uncured synthetic resin having predetermined setting characteristics, disposing the foil between the elements to be joined, applying a current to the foil for a time sufficient to cause a thermal deformation or wrinkling of the foil while the resin is in a plastic condition, and completing the cure of the resin primarily by residual heating effects on the resin.

3. The method as described, of bonding a pair of solid elements to form a substantially planar joint therebetween, which consists in coating a very thin imperforate sheet of electrically conductive material with a resin of a type adapted to cure or set under the influence of heat, effecting a first stage of setting of the resin by passing an electric current through the conductive sheet for a few seconds, and during such period physically confining the sheet to an extent such that expansive forces therein result in an appreciable crinkling or like deformation of the sheet, and thereafter continuing and completing the cure or setting of the resin in situ substantially by residual heat in the sheet and resin.

4. The method as described, of bonding a pair of solid elements, which consists in coating a thin electrically conductive imperforate sheet of metal substantially coextensive with the area of the bond or joint, with a resin characterized by thermal curing or setting properties, disposing the coated sheet between the solid elements to be bonded, applying an electric current to the sheet of metal while in situ between the elements for a few seconds under time-temperature conditions such as to effect a crinkling deformation of a substantial portion of the area of the metal, and thereafter continuing the cure for a longer period of time under substantially reduced current conditions.

5. The hereindescribed method of bonding a pair of solid elements of relatively low thermal conductivity to produce therebetween a substantially planar joint, which consists in coating a conductive imperforate metal foil with an incompletely cured heat-setting resin, disposing the foil between the elements to be joined, subjecting the coated foil to a moderate pressure and while same is in the region of the joint, applying an electric heating current to the foil for a period of a few seconds to effect a wrinkling characteristic in the foil and to effect a partial cure of the resin, and continuing the cure of the resin to full setting while the foil is subjected to less heat during a cool-off period.

6. The method as described, of effecting a bond between a pair of adjacent elements of low thermal conductive properties such as pieces of wood, which consists in coating a very thin imperforate sheet of aluminum foil on its opposite faces with a layer of a thermocuring synthetic resin, applying said resin to form thereof a layer of a few thousandths inch thickness, arranging the solid elements on opposite sides of the coated foil and subjecting said elements and coated foil to a moderate physical pressure, passing an electric current of a commercial frequency and of relatively low amperage through the foil to heat the resin, continuing such passage of current for a few seconds to produce a distinct wrinkling effect in the foil, then substantially reducing the current through a substantially longer period of time to effect final setting of the resin.

7. The method involving the series of steps as recited by claim 6, but further particularized in that said penultimate stage of curing is not continued substantially longer than ten seconds.

8. The hereindescribed method of making a substantially planar joint between a pair of adjacent elements of wood, which consists in coating an imperforate aluminum foil having a thickness of an order not materially exceeding $5/1000$ inch, on both of its faces with a layer of a thermoplastic resin of a substantially green character, disposing the coated foil between the elements of wood to be joined, subjecting the wood elements and foil to at least a light clamping pressure, applying to the foil a current of the order of a few amperes and of a commercial frequency for a penultimate curing period of the order of 5–10 seconds so as to produce a distinct wrinkling effect in the foil, and thereafter reducing the current to a minimal value and continuing the cure through a final stage for a period of time of at least several minutes, and after full setting or curing of the resin, relieving the joint of physical pressure.

JAMES M. BAGGOTT.

References Cited in the file of this patent

UNITED STATES PATENTS

| Number | Name | Date |
|---|---|---|
| 1,265,841 | Walker | May 14, 1918 |
| 1,945,560 | Meyercord | Feb. 6, 1934 |
| 2,241,312 | Luty | May 6, 1941 |
| 2,261,264 | Luty | Nov. 4, 1941 |
| 2,293,413 | Stoner | Aug. 18, 1942 |
| 2,372,929 | Blessing | Apr. 3, 1945 |
| 2,393,100 | Gallay | Jan. 15, 1946 |
| 2,401,281 | Webb | May 28, 1946 |
| 2,465,284 | Schmidt | Mar. 22, 1949 |